(12) United States Patent
Castiel

(10) Patent No.: US 7,277,673 B2
(45) Date of Patent: Oct. 2, 2007

(54) VIRTUALLY GEOSTATIONARY SATELLITE ARRAY WITH OPTIMIZED PARAMETERS

(75) Inventor: David Castiel, Wash., DC (US)

(73) Assignee: Virtual Geosatellite LLC, Washington, DC (US)

( * ) Notice: Subject to any disclaimer, the term of this patent is extended or adjusted under 35 U.S.C. 154(b) by 638 days.

(21) Appl. No.: 10/354,933

(22) Filed: Jan. 29, 2003

(65) Prior Publication Data

US 2003/0228867 A1    Dec. 11, 2003

Related U.S. Application Data

(60) Provisional application No. 60/352,984, filed on Jan. 29, 2002.

(51) Int. Cl.
*H04B 7/185* (2006.01)

(52) U.S. Cl. ............... 455/12.1; 455/3.2; 455/13.2; 455/427; 342/352; 342/358; 370/321

(58) Field of Classification Search ............... 455/3.2, 455/12.1, 13.1, 13.2, 427–430; 701/226, 701/13; 244/158 R; 342/352, 358, 359, 342/356, 357.06, 357.12; 370/321, 331, 370/315, 316
See application file for complete search history.

(56) References Cited

U.S. PATENT DOCUMENTS

| 4,502,051 A  * | 2/1985  | Dondl ..................... 342/356 |
| 5,202,829 A  * | 4/1993  | Geier ..................... 701/215 |
| 5,439,190 A  * | 8/1995  | Horstein et al. ........... 455/12.1 |
| 5,812,932 A  * | 9/1998  | Wiedeman et al. ......... 455/13.1 |
| 5,845,206 A  * | 12/1998 | Castiel et al. ............. 455/13.4 |
| 5,871,181 A    | 2/1999  | Mass |
| 6,195,037 B1 * | 2/2001  | Gross et al. .............. 342/354 |
| 6,327,523 B2 * | 12/2001 | Cellier ..................... 701/13 |
| 6,328,264 B1   | 12/2001 | Maeda et al. |
| 6,333,924 B1 * | 12/2001 | Porcelli et al. ............ 370/331 |
| 6,430,393 B1   | 8/2002  | Rosen et al. |
| 6,954,613 B1   | 10/2005 | Castiel et al. |
| 2001/0041950 A1* | 11/2001 | Cellier ................... 701/13 |
| 2002/0136191 A1* | 9/2002  | Draim et al. ............. 370/344 |
| 2002/0160710 A1* | 10/2002 | Castiel et al. ............ 455/12.1 |
| 2002/0177403 A1* | 11/2002 | LaPrade et al. .......... 455/12.1 |
| 2004/0211864 A1* | 10/2004 | Less et al. .............. 244/158 R |
| 2006/0276128 A1* | 12/2006 | Castiel et al. ............ 455/12.1 |

OTHER PUBLICATIONS

Stuart J.R., et al., "Review of ESA Archimedes Study 1", *Highly Elliptical Orbit Satellite Systems*, IEEE Colloquium on May 24, 1989, pp. 2/1-2/4.

* cited by examiner

*Primary Examiner*—Edan Orgad
(74) *Attorney, Agent, or Firm*—Dort Patent, P.C.; David Dort

(57) ABSTRACT

A plurality of satellites are placed into a virtually geosynchronous orbit, in which a first part of the orbit, that is near apogee, has a similar movement to the rotation of the earth, and therefore the orbit appears virtually stationary relative to the earth. Different satellites in the orbit are caused to have specified standardized parameters, and also defined according to an orbital position at a date certain. The different satellites and therefore be assigned to different owners according to these parameters.

6 Claims, 7 Drawing Sheets

US 7,277,673 B2

VIRTUALLY GEOSTATIONARY SATELLITE ARRAY WITH OPTIMIZED PARAMETERS

CROSS-REFERENCE TO RELATED APPLICATIONS

This application claims benefit of U.S. Provisional Application No. 60/352,984, filed Jan. 29, 2002.

BACKGROUND

Satellites in geostationary orbits are at virtually the same location relative to the earth, at points and times in the earth's rotation. Geosynchronous orbits require specified parameters (22,300 miles; 0° inclination) to make this work. Hence there is only one orbital track or "orbit" which can be used for a geosynchronous satellite. Within that orbit, there are only a limited number of available geostationary slots. However, the demand for satellite space increases in line with the demand for bandwidth. In recent years, demand for bandwidth has been increasing exponentially.

The arrangement that has been adopted over time uses multiple slots within the single ground track orbit, each slot having approximately 2 degrees of width relative to an earth-centered angle. This allows for communications with a minimum of electronic interference using directed antennae. The geo ring around the equator hence has a total of 180 slots (360 degrees divided by 2 degrees).

There are a limited number of geosynchronous slots that remain available.

SUMMARY

The present invention teaches an array of virtually geostationary satellites which address this problem, and provides a totally new area for a plurality of satellites in new slots. These new slots have many of the advantages of geostationary orbits.

A new geo like space called the virtual geo space is disclosed according to the present invention. This provides new real estate in the satellite sector.

The space includes a plurality of satellites in elliptical orbits, which satellites are active during an "active arc" occurring during their apogee portions. Multiple satellites can be placed in each orbit to trace the same ground track. The same number of satellites, at least one, is in the active arc apogee portions at any one time.

Another aspect relates to the findings different satellites within the different arcs/ground tracks in a way that enables different satellites within the same arc to be operated by different owners. In the past, allocating authorities such as the FCC have typically assigned a specific satellite real estate to one owner. In this system, the satellite may shift within the arc, but still be assigned to the same owner, and different owners may be assigned to different satellites, which continually shift in position within the arc.

BRIEF DESCRIPTION OF THE DRAWINGS

These and other aspects of the invention will be described in detail with reference to the accompanying drawings, wherein.

DETAILED DESCRIPTION

Figure 1:
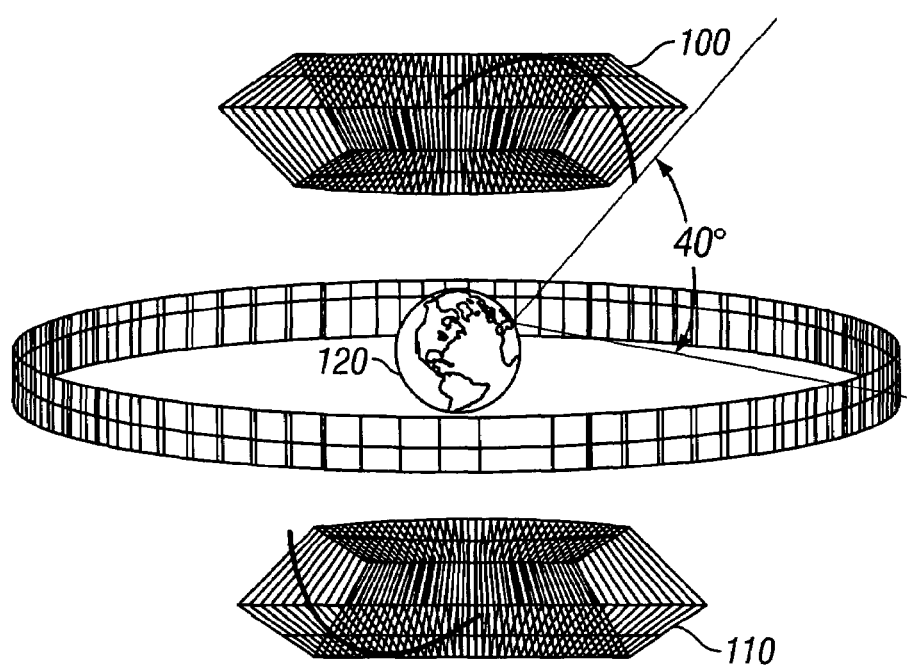
FIGS. 1 and 2 show the orbits and orbital space of the satellite array of the present application.
Figure 2:
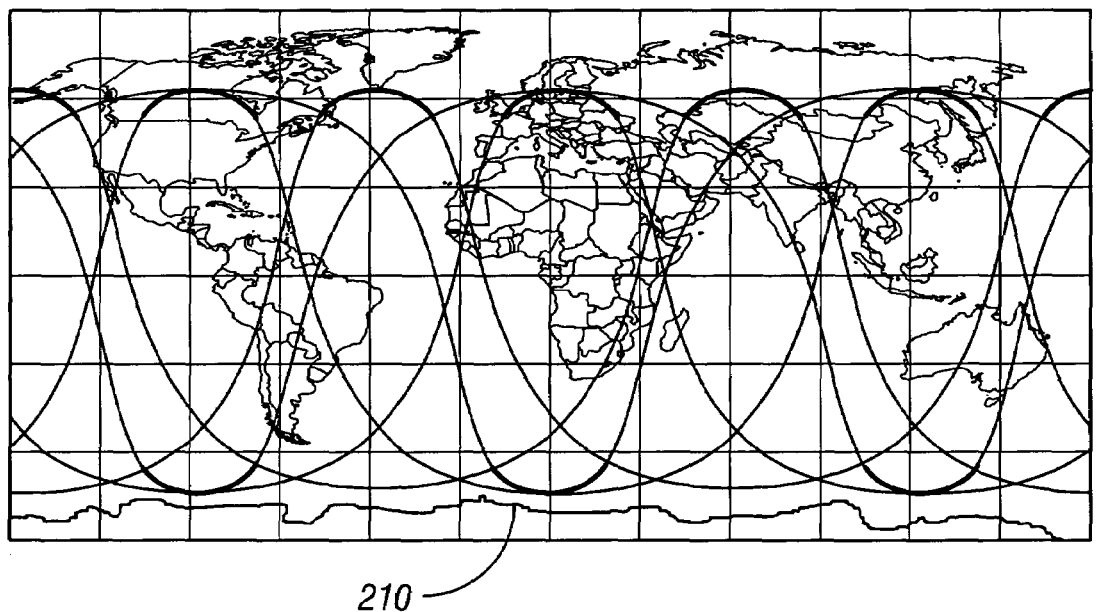

FIGS. 1 and 2 show the orbits and orbital space of the satellite array of the present application. Each of a plurality of satellites are placed into elliptical orbits of a special type. The preferred orbits are inclined at inclination of around 63 degrees, e.g., 63.435 or 116.565 degrees. The satellites are posigrade, elliptical orbits having three revolutions per sidereal day.

The argument of perigee refers to the location of the lowest altitide portion of the orbit around the orbit from the point in the orbit where the orbiting satellite crosses the equator in a northward direction. The orbits preferably have an argument of perigee of near 270 or ninety degrees, which has the effect of placing the apogee or highest point of the orbit over the northern-most or southern-most portion of the orbit respectively.

The orbits also have an eccentricity of around 0.65 to 0.66.

The satellite may also have an apogee altitude of 26 967.6 km, perigee altitude of 798.3 km, argument of perigee at or near 270 or 90 degrees, eccentricity of about 0.66, altitude over the equator of approximately 5430.6 km, altitude at start and end of the active arcs of 17,787.7 km, 45.1 degrees (north or south) latitude at start and end of the active arcs, and nominal latitude of 63.435 degrees. The orbit semi major axis is approximately 20250-20230 km.

Orbits having an integer number of revolutions per day will have a ground track that passes over the same points on the earth every (siderial) day. Such ground tracks are referred to in this specification as repeating ground tracks.

The satellites are only active during part of their time of orbit. The time when the satellites are active is referred to as active arcs. The active arcs are defined to be around the orbital apogee, where the satellites travel most slowly. This maximizes the time that a satellite spends in the active arc. In this embodiment, each earth communicating satellite remains in each active arc for 4.8 hours. After leaving the active arc, each earth communicating satellite becomes inactive and non-radiating, and spends 3.2 hours transiting to its next active arc. The satellite then enters another active arc and begins communications again. This means that each satellite is active for 4.8/(4.8+3.2)≈60% of the time.

Each of the satellites include communication equipment which communicates with corresponding communication equipment located on the earth. Therefore, the satellites may communicate with various points on the earth.

Near apogee, where the satellite's progress slows, its motion almost matches the rotational speed of the earth. Therefore the Earth-communicating satellites in the active arcs will therefore appear to hang, or loiter over the earth. Since the argument of perigees are at the southern- or northern-most ends of the orbits, the active arcs straddle the apogees, and the corresponding active portions of the ground tracks, are hence displaced at a large angle to the North or South respectively from the equator and the geostationary orbit.

A first set of satellites have apogees in the Northern Hemisphere forming the space 100. Those satellites are also shown in the ground track map of FIG. 2, with their respective apogees 200 shown being bolded in FIG. 2. A second set of satellites has apogees in the Southern Hemisphere forming the space 110.

Two ground tracks are illustrated having active arcs in the Northern Hemisphere, and one ground track is illustrated having active arcs in the Southern Hemisphere.

FIG. 2 shows the active parts of the arc in bold. While the satellites are in these active parts of the arc, they have a similar rotational rate relative to the earth, and move very little relative to the earth. The space in which these apogees occur moves at a similar rotational rate to the Earth, thus becoming the "virtual geostationary space", in which active arcs derived from virtual geosationary orbits, lay.

The virtual space may therefore include a plurality of satellites, each of which is in a highly elliptical orbit with its apogee over a Hemisphere, either the Northern or Southern Hemisphere.

In the embodiment disclosed herein, the satellite is active over substantially 4.8 hours (e.g. 4.8 hours 310 percent) out of every 8 hour orbit, this orbit repeating itself 3 times per day (24 hour day) and defining a repeating ground track. More generally, each of the satellites is active for substantially 60 percent of the time it is in orbit, but more generally can be active within 45 and 80 percent of the time that it is in orbit.

Figure 3:
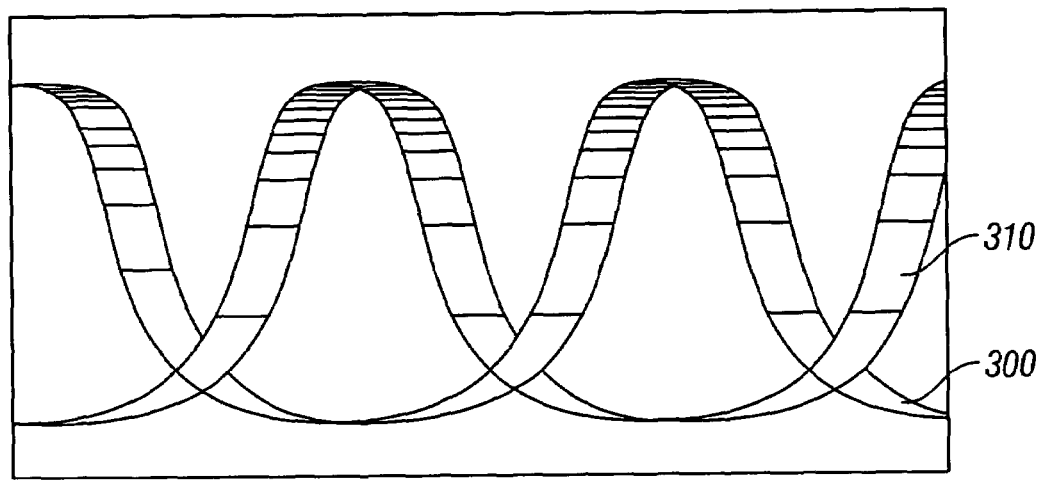
FIG. 3 shows multiple satellites in a ground track.

Several satellites may occupy the same ground track, such as 210. The satellites in the single ground track are timed so that as soon as one satellite leaves each active arc of the ground track, another enters that active arc. Each ground track has three active arcs around the earth, and, if continuous coverage is desired, enough satellites are placed in the ground track, spaced evenly in time, so that there is always one satellite in each active arc per system. For example, FIG. 3 shows 72 satellites in each ground track 300, 310. The active arc includes the top part of the curve. FIG. 3 shows how the satellites bunch up in this area, and that there are relatively fewer satellites in the other, non-active, areas. The satellites are preferably placed within the active arc in a way such that there is at least one satellite in each active arc per system at all times, but preferably more than one.

With these parameters, a ground track with three active arcs provides a coverage of substantially three times fifty degrees of longitude, or 150 degrees of longitude. A second ground track may be interleaved to create a second set of active arcs in the Northern Hemisphere to thereby provide another 150 degrees of occupied longitude. This provides a total of 300 degrees of longitude occupied by the active arcs (or less if the two ground tracks overlap in areas of high demand for example). The active arcs may be placed, as shown, to maximize the viewing angles to Continental areas.

The satellites tend to bunch up at the regions near apogee since this is the time when the satellites move the most slowly. FIG. 3 shows this effect, with most of the satellites being bunched at the apogee areas. However, if the satellites are placed in this way, as described herein, their ground tracks will not cross one another during their active periods. If two groups of satellites are displaced by 45 degrees from one another as in FIG. 2, the satellites appear as six, distinct, parabolic shaped active arcs in the Northern Hemisphere on a Cartesian map. Six active arcs in the Southern Hemisphere could also be used. The active arcs in the Southern Hemisphere could be the inverse of the Northern Hemisphere active arcs.

Since the satellites are only communicating near apogee—active arcs, these create the virtual Geo space as shown in FIG. 1. The satellites actually trace a complete path which is not shown in FIG. 1. However, the space 100 is formed only by the active arcs of the satellites. The satellites actually travel in other positions besides these active arcs, but communicate only within these active arcs.

Multiple earth communicating satellite systems may use the same active arcs disclosed above, to place its earth communicating satellites in the same ground tracks as above. However, this system times the entry of its satellites to differ from those of other systems by at least $t_\theta$, where $\theta$ is the minimum separation desired in the active arc occurring at apogee, and to is the time necessary for a satellite to move that distance at that location.

Table 1 summarizes some exemplary slot parameters.

TABLE 1

Mathematical Relationships between Desired Orbital Separation Angle, Relative Mean Anomaly, and Relative Right Ascension

| Satellite Separation, Earth Central Angle | Satellite Separation, Relative Mean Anomaly between a leading and following satellite in a ground track | Relative Right Ascension |
| --- | --- | --- |
| □ | −360 ($t_\square$/P) (following relative to leading) (following satellite has lower value) | 360 ($t_\square$/86,400) (following relative to leading) (following satellite's orbit has higher RAAN) |

Where:
RMA is relative mean anomaly or Mean Anomaly difference between two satellites in degrees relative to a common epoch (reference time), as measured in each respective orbit, Relative Right Ascension is the difference in degrees between the RAANs of two orbits, $t_\square$ is the time required to move □ degrees true anomaly at apogee in seconds, P is satellite orbital Period in seconds The table provides mathematical relationships between Right Ascension of the Ascending Node and Mean Anomaly for satellites flying in the same ground track, but separated by a minimum of $\theta$ degrees earth central angle. Each entry time differing from its neighbor by $t_\theta$ constitutes a slot in the active arc. Each satellite in each active arc occupies one slot in that arc. A "protected" interval may exist around the satellite which travels with the satellite. In a geostationary orbit, a slot is defined by the longitude of the point on the earth under it. In this virtual geostationary orbit, a slot is defined as an active arc entry time stated for a specified epoch day. Ground tracks and active arcs may be created, with one satellite in each active arc at all desired times.

The orbital parameters described above may be varied somewhat while still preserving the characteristic of stationary active arcs over the northern or southern hemisphere. However, all satellites to be slotted together into active arcs in a coordinated fashion using this scheme may agree to use at least the same Mean Motion, eccentricity, inclination, argument of perigee, and ground track. The right ascension of the ascending node and mean anomaly of each satellite are preferably also adjusted together in order to place the satellite on the specified ground track at the satellite's specified time of active arc entry. This yields a coordinated motion among all such satellites where minimum separation criteria among them can be guaranteed.

Orbital parameters are adjusted to create ground tracks that repeat daily. In this preferred embodiment, each ground track has three active arcs in the Northern Hemisphere. Each active arc spans around 50 degrees of longitude at the highest portion of the orbit. All three active arcs therefore occupy around 150 degrees of longitude.

A second ground track interleaved with the first creates a second set of active arcs in the Northern Hemisphere accounting for another 150 degrees of occupied longitude, for a total of 300 degrees of longitude occupied by active arcs. The two ground tracks are spaced so as to maintain a minimum separation between all active arcs (distributing the remaining 60 degrees of longitude as spacing) while providing optimum position and coverage characteristics for the active arcs. Active arcs can be freely placed to maximize viewing angles to desired service areas.

This process is repeated in the Southern Hemisphere using orbital arguments of perigee of around 90 degrees.

Figure 11:
FIG. 11 shows the view from earth from one satellite.

Since earth communicating satellites using these active arcs are in orbit at over 17,000 to over 27,000 km, from these high vantage points each satellite in an active arc can see ground area encompassing several active arcs. FIG. 11, for example, shows a satellite earth view and ground track 1100 for a single satellite, with its apogee over North America.

In order to place multiple satellites onto the same ground track passing at spaced time intervals, the planes of the orbit of following satellites may be rotated about the earth's axis by the amount and in the direction the earth has rotated in the interval between the times the satellites pass over a given point. Larger time intervals between satellites in a ground track may cause more orbital rotation of the following satellite about the earth's axis to keep the satellite over the same ground track. This angle, when measured relative to a celestial reference point, e.g., the position of the sun against the backgrop of stars at the time of the Vernal Equinox, is known as the orbit's right ascension of the ascending node (RAAN). If all satellites moved in the same orbit, rather than orbits that have been adjusted for earth rotation, following satellites would travel in ground tracks further to the west of those of the preceding satellite, since the surface of the earth is constantly moving around to the east relative to the stars. Hence to follow a common ground track and share active arcs, each satellite should occupy its own orbit having its own RAAN.

Figure 4:
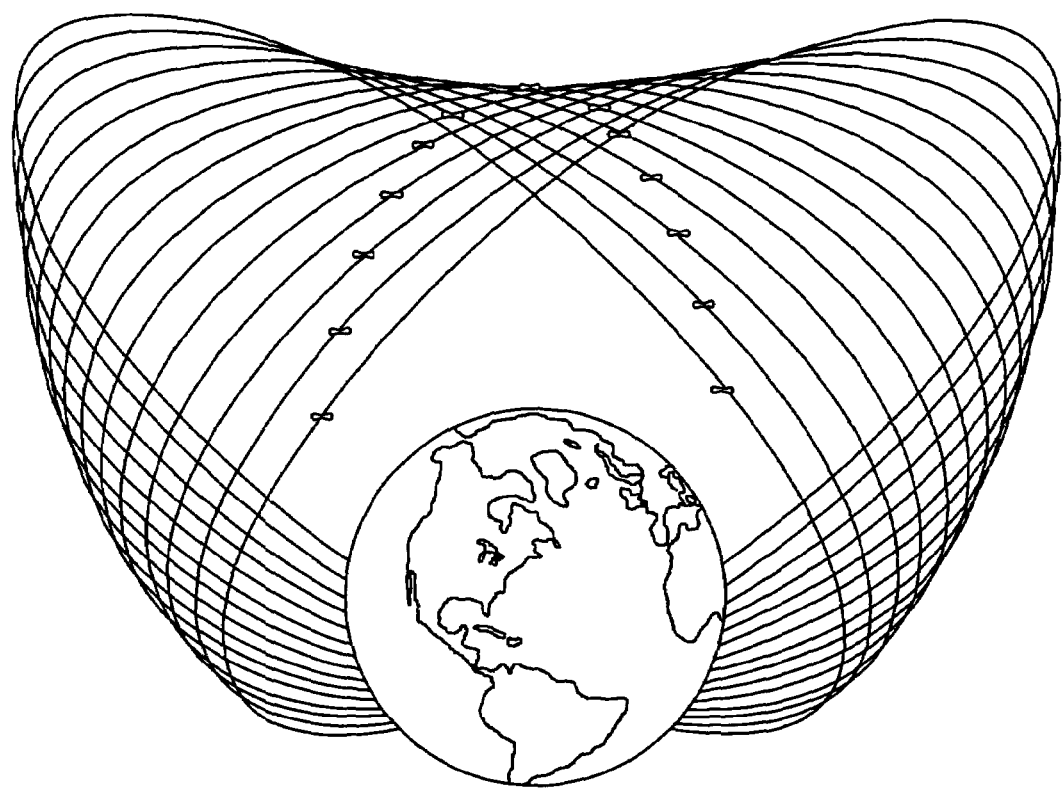
FIG. 4 shows separate satellites in separate slots in active orbits.

FIG. 4 illustrates the satellites occupying successive slots in one active arc and the separate orbits and relative positions in orbits which allow each satellite to follow the active arc properly.

Spacing in space can be assured by ensuring a constant separation of the points in the ground tracks under each satellite, and if necessary adjusting orbits to ensure differing altitudes at ground track crossings.

Figure 5:
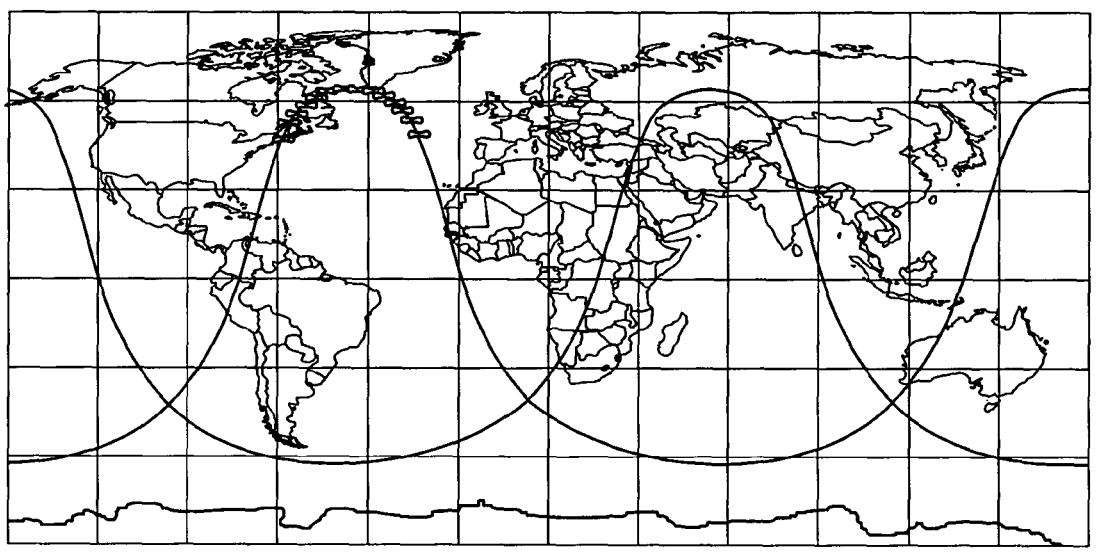
FIG. 5 shows the positions of those satellites in the active arc of the orbit.

FIG. 5 illustrates the relative positions of the satellites shown in FIG. 4 within one active arc of one ground track.

Figure 6:
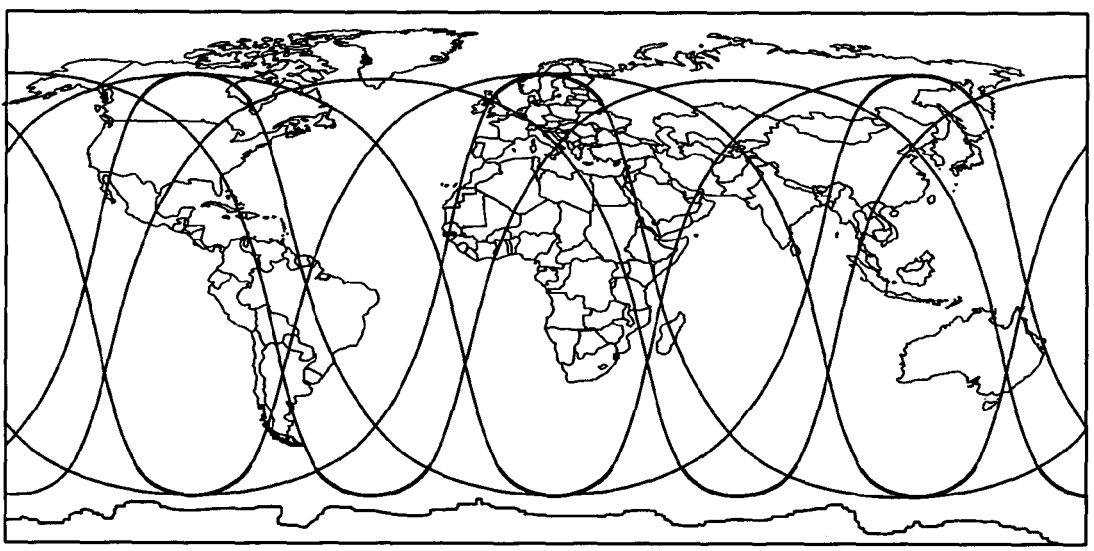
FIG. 6 shows a configuration with four ground tracks.
Figure 7:
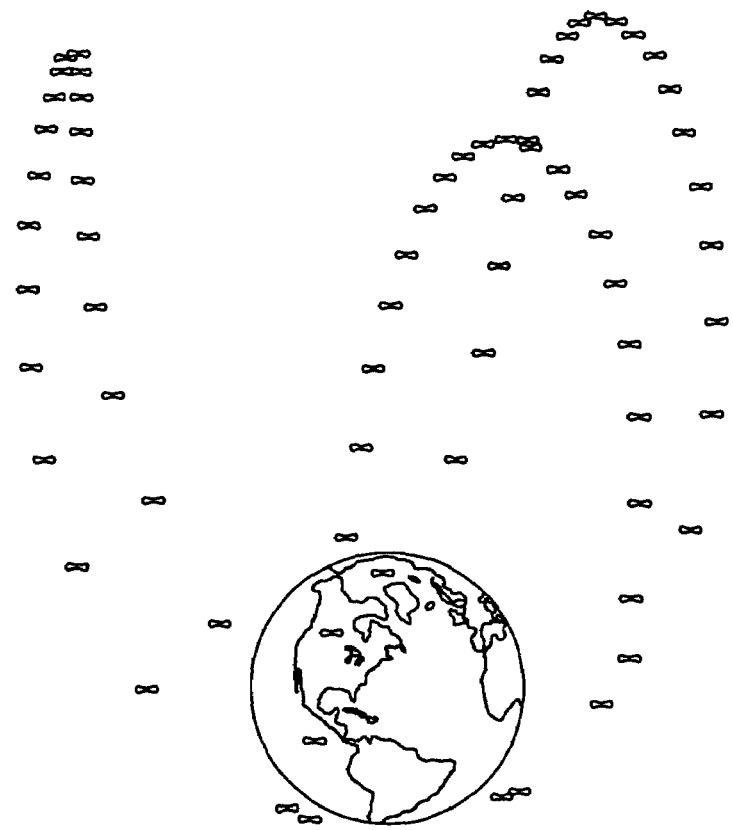
FIG. 7 shows the satellites in one of the ground tracks of the FIG. 6 embodiment.

FIG. 6 illustrates a possible configuration of four ground tracks over the earth. FIG. 7 shows 72 satellites placed in just one of the above ground tracks.

Figure 8:
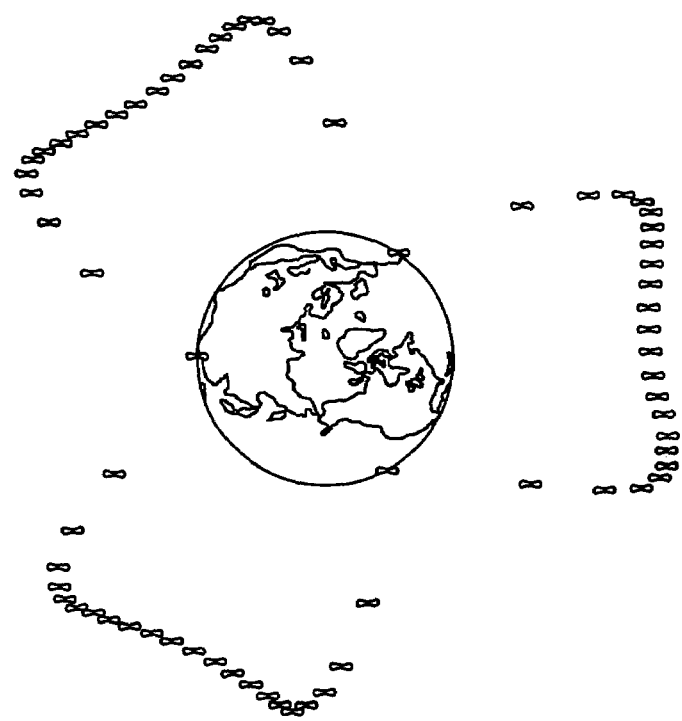
FIG. 8 shows the FIG. 7 (single ground track) satellites from a hypothetical north view, showing the virtually geostationary area.
Figure 9:
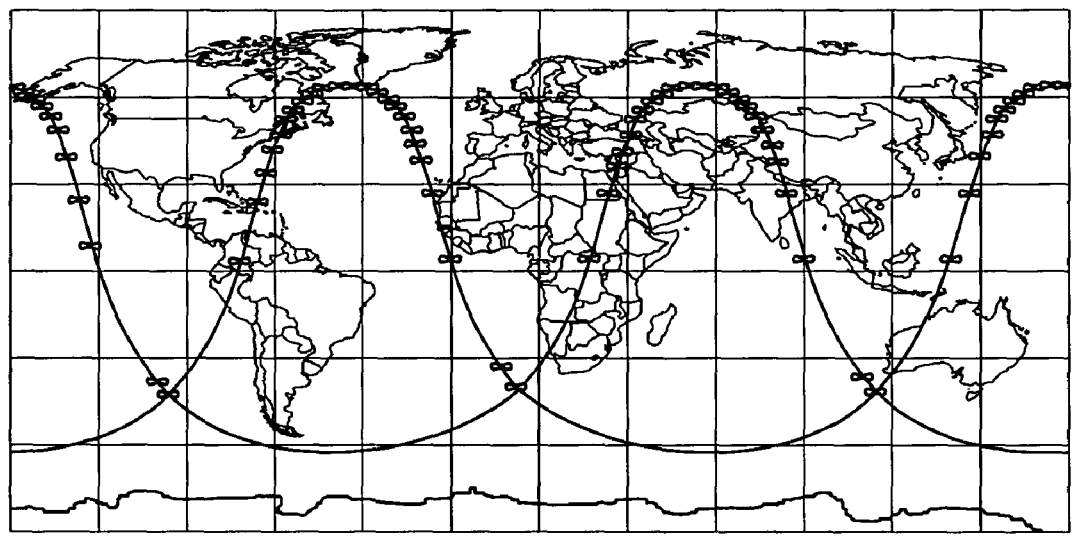
FIG. 9 shows the ground tracks of the satellites of FIGS. 7 and 8.

FIG. 8 shows the same 72 satellites seen from the North, effectively, the FIG. 7 view, from the north. Satellites follow behind each other in the paths illustrated in these figures, while maintaining a separation of at least two degrees earth central angle from all other satellites. The active portion of the ground track occurs in the higher, flattened portion 800 of the satellite paths shown in FIG. 8. These portions, or "petals" in this view, are geo-synchronous creating a "virtual geostationary" arrangement for placing earth communicating satellites. FIG. 9 shows the satellites of FIGS. 7 and 8 in their ground track.

If the satellites are spaced so as to maintain at least, for example, two-degree intervals at apogee within the active arc, on the order of 72 satellites can be placed in each ground track, comprising 15 in each of three active arcs and 9 in transit between active arcs in each ground track. Each satellite travels in its own orbit, as shown in FIG. 4. The 72 similar orbits differ only by their RAAN and mean anomaly (MA), whereby in this example the RAAN of the orbit of each immediately following satellite in the ground track is increased by 5 degrees over that of the preceding satellite and its mean anomaly adjusted to be 15 degrees less than the preceding satellite.

Figure 10:
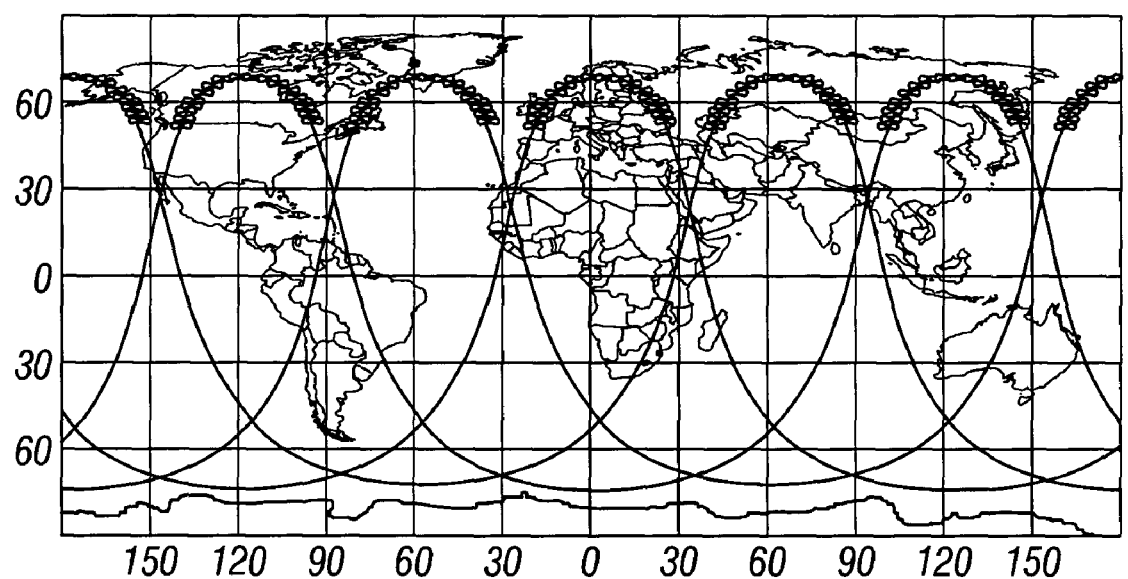
FIG. 10 shows illustrates active arcs occupied with satellites placed at an approximate 2-degree spacing.

Since this embodiment uses four ground tracks, each with three active arcs, this embodiment can accommodate 4 ground tracks·15 satellites per active arc·3 active arcs per ground track=180 active arc satellite slots. FIG. 10 illustrates active arcs occupied with satellites placed at an approximate 2-degree spacing.

In this embodiment, the apogee of the satellites lies at around 27,000 kilometers above the surface of the earth, or around three-quarters the altitude of satellites in the geostationary orbit. The lower 27,000 kilometer apogee altitude of this embodiment leads to savings in satellite costs, since the shorter path to and from the satellite yields less path loss, on the order of 60 percent or less than that of a geostationary satellite. The consequent reduced power requirements for a given link translate into savings in satellite weight and cost for a given capability. In addition, the orbit used in this preferred implementation requires less than half the launch energy required for launch into the geostationary orbit, yielding additional savings. These savings offset the costs of satellite time spent outside of active arcs.

FIG. 1 shows a 40 degree separation between the active arcs and the Geo band. However, other degrees of separations can also be used, simply by setting the amount of time or length of active arc of communicating with the satellites.

Different numbers of satellites may be used, as described herein. In an embodiment, the satellites form two different ground tracks in each of the Hemispheres. Each of the ground tracks has three distinct active arcs. FIG. 2 shows two ground tracks in the Northern Hemisphere, with six active arcs, and a single ground track in the Southern Hemisphere, and the 3 active arcs of that single ground track. In the embodiment of FIG. 2, there are 3 other ground tracks. This includes one ground track for the Northern Hemisphere and two for the Southern Hemisphere. These ground tracks can be populated by satellites. In this embodiment, the peak of the active arcs, or apogees, is at 63.4 degrees latitude.

One advantage of this system is that this may avoid interference between the virtual geo satellites, and the geo ring of satellites. The disclosed system may have more than 40 degrees of separation between the satellites and the geo ring.

Other modifications of these parameters can of course be used. While the above has described the peak of the active arcs being at 63.4 degrees, the minimum latitude for the active portions of the active arcs is about 45.1 degrees latitude, on either side of the apogee. Anything greater than that, and specifically, anything greater than 50 degrees latitude, may be preferred.

The mean anomaly spacing to ensure 2 degrees of satellites separation near apogee is 1080/72 or 15 degrees. Each daily ground track covers 3×360 degrees or 1080 degrees. Therefore, there can be 72 satellites per ground track. With 4 possible ground tracks, this can produce an effective possibility of 288 slots, using the 15 degree mean anomaly spacing. Each arc therefore may have 72/3=24 satellites. Between 4 and 5 satellites out of the 24 within each active arc is in active duty at any one time. Conversely, between 19 out of those 24 stay in standby mode in each loop at any time.

While 288 satellites may be the maximum theoretical numbers, 280 satellites total, or 70 per ground track, provides 14 satellites per active arc rather than 14 and a fraction. This may avoid phasing problems between different users that might otherwise occur. This provides a mean anomaly spacing of 1080 degrees divided by 70 equals 15.428 degrees and about 2.06 degrees width slots at apogee.

Up to 14 independent systems can use the fourteen slowly moving, active, satellites in each active arc. This may provide a total of 42 slots for the three active arcs in each one ground track. With 70 satellites in a single ground track, continuous coverage may be provided underneath all three active arcs. If only a single ground track is used, then there may be a triangular outage region along the equator, midway between peaks of the active arcs, jumping to about 20 degrees of latitude. However, the second ground track provides continuous coverage of the entire Hemisphere including all the equatorial regions.

This system may have multiple advantages. By making the satellites active during only part of their orbits, the satellites create no interference with each other or with the geosatellites. The satellites are also much lower in altitude than the geo satellites. Hence latency may be better than geos, the satellites may be smaller, less expensive, require a smaller antenna, are less expensive to launch and allow more frequency reuse.

The apogees at the active arcs may be placed at specific longitudes to concentrate the capacity over land masses. These satellites may use primarily Ku and C bands, but may also use the Ka Band.

Another embodiment relates to a technique that allows defining VGSO allocations by an allocating authority (e.g. the FCC) and their tolerances. The following embodiment describes a way in which virtually geosynchronous satellites could be allocated by the allocating authority. For example, this system may describe tolerances which enable different satellites within the same active arc or ground track to be assigned to different owners or users. A technique is disclosed to enable satellites in the same arc to be assigned to different users. These satellites may shift in position within the arc at different times, since they are not geosynchronous relative to the arc. However, the satellites are defined in a way that allows different users to own different satellite positions within the arc.

Simulation studies have shown that variations in orbital elements interact (as would be expected) to produce a net effect in satellite movement, as seen from Earth Stations. As expected, small perturbations in right ascension, argument of perigee, or mean motion alone, for example, can produce significant movement out of track and out of timing for a VGSO satellite. However, further analysis demonstrates that certain combinations of orbital perturbations can substantially counteract each other and result in relatively small net movements over much (but usually not all) of the active arcs. An example is certain combinations of perturbations to mean anomaly and argument of perigee. Therefore it does not appear easily feasible to specify easily measurable, two-dimensional parameters as seen from the ground at specific times (such as azimuth and elevation parameters at a specified active arc entry and/or exit time) and guarantee good performance over the entire active arc in the face of perturbations to the satellite's orbit.

It might suffice to specify a full set of orbital parameters and place tolerances on each of them, but that approach then does not lead to easily observable, measurable, or verifiable characteristics without doing a full orbital mechanics analysis. Therefore, to avoid overly esoteric tolerance specifications while protecting against poorly performing but in-spec possibilities, the inventors postulate what they believe is a very workable approach to specifying tolerances. In this embodiment, limits are placed on in-track and cross-track offsets applicable at all times within the active arcs. This has the desirable effect of ensuring good satellite placement while ignoring any perturbations that are not relevant to that objective.

Note that any tolerance specification should only concern measurement within the active arcs. At other times the satellites are quiescent, hence interference is not an issue. Moreover, when quiescent, satellites may not be able to participate in ranging, telemetry or other activities designed to aid in position determination.

The inventors have found that the following parameters may define and assign allocations within the VGSO operating environment. The tolerances below yield generous station-keeping boxes while ensuring tight-enough tolerances on satellite movement so as not to contribute significantly to adjacent satellite interference levels over nominal values. While the following represents preferred values, it should be understood that other similar values could be alternatively selected.

Specification:

| | |
|---|---|
| Mean Motion | 3.000 |
| Inclination: | 63.435°, specifically that required to ensure a fixed argument of perigee in a posigrade orbit |
| Eccentricity: | 0.630 |
| Argument of perigee: | 270° for Northern arcs (ground tracks 1a and 2a) 90° for Southern arcs (ground tracks 1b and 2b) (see 2 below) |
| Longitude of Apogee over Americas: | 65° West (ground tracks 1a or 1b, occurring at 180° Mean Anomaly), or 125° West (ground tracks 2a or 2b, occurring at 180° Mean Anomaly), as assigned |

Allocations may occur in any of four ground tracks:

| I. GROUND TRACK | II. ARGUMENT OF PERIGEE | III. LONGITUDE OF APOGEE OVER AMERICAS |
|---|---|---|
| 1a | 270° | 65° W |
| 1b | 90° | 65° W |
| 2a | 270° | 125° W |
| 2b | 90° | 125° W |

Each satellite may operate over an active arc spanning 72° to 288° of Mean Anomaly within its orbit, plus the three minutes of time preceding 72° Mean Anomaly and 3 minutes of time following 288° of Mean Anomaly. At all other times each satellite must suppress all radiation by at least 60 decibels below that authorized during operation in the active arc.

Each authorized satellite is allocated a time on a specified date certain, e.g. the first of January 2005 at which it shall arrive at a specified mean anomoly, e.g., 72° Mean Anomaly in its orbit within the Americas Active Arc for its assigned Ground Track. The time of arrival at 72° Mean Anomaly on other days may be calculated by adding or subtracting an appropriate integer number of sidereal day intervals (i.e., that time necessary for the earth to rotate precisely once with respect to the stars, being approximately 23 hours and 56 minutes) to result in a time within the desired day.

| Allowable orbital tolerances | |
|---|---|
| In-Track Tolerance | No satellite shall arrive at any point within any active arc at a time more than 45 seconds removed from that predicted by the satellite's assignment, over the lifetime of the satellite. |
| Cross-Track Tolerance | No satellite shall move out of track by any more than 0.1 degrees as seen from any point on the earth, from that track predicted by the satellite's assignment, over the lifetime of the satellite. |

An explanation of the constellation parameters follows:

a. Mean Motion: The number of revolutions around the earth the satellite makes in 1 day.

An integer value of mean motion ensures that the satellite will repeat the same ground track each day. Since we want all satellites to follow a repeating ground track, and wanted each satellite to visit no more than 3 active arcs, we selected an integer mean motion, rather than a rational mean motion, which would have yielded repeating ground tracks at intervals longer than one day.

A mean motion of 4 yields 4 active arcs per ground track and active arcs that are too broad to maintain the regional geographic coverage that we desired.

A mean motion of 2 yields 2 active arcs per ground track, and very narrow active arcs. Slotting here is less feasible, since positions on the active arc are not well separated in angle. Also, its apogee altitude is high, being around 38,500 kilometers, leading to high latency. This is the well-known Molniya orbit.

b. Inclination: 63.435 degrees. This figure prevents the line of apsides, the line connecting the apogee and perigee, from rotating around the orbit, moving the apogee southward toward the equator. If the inclination is higher, the line of apsides will rotate in a direction opposite to the direction of satellite motion. If lower, the line of apsides will rotate around the orbit in the same direction as satellite motion.

c. Eccentricity 0.66. This value is the maximum feasible value, which, when combined with the necessary mean motion, yields an apogee of 27,271 kilometers, and a perigee of 513 kilometers. While there is some small amount of drag at perigee, orbit lifetimes are expected to be well into the tens of years, since most of the orbit is spent much higher. A lower eccentricity will yield lower apogees, higher perigees and even less atmospheric drag and LEO orbit intersection, but slightly lower declinations (angle above the equator from the center of the earth) for the lowest part of the active arcs, per Table 1. Coverage Area will be also reduce somewhat, due to lower operational satellite altitudes at active arc end points.

TABLE 1

The Effect of Eccentricity on Orbital Parameters

| Eccentricity | Declination of lowest point in active arc, degrees | Apogee, kilometers | Altitude of ends of arcs, km | Perigee, kilometers |
|---|---|---|---|---|
| 0.66 | 46.02 | 27,271 | 18,025 | 513 |
| 0.65 | 45.34 | 27,068 | 17,863 | 716 |
| 0.64 | 44.64 | 26,865 | 17,702 | 919 |
| 0.63 | 43.95 | 26,680 | 17,544 | 1,122 |

An eccentricity value in the above range may be chosen with relatively little effect on HLSA characteristics and advantages. Lower eccentricities move the lower ends of the active arcs closer still to the equator, and become increasingly less desirable.

d. Argument of Perigee: 270 degrees for northern ground tracks and 90 degrees for southern ground tracks. These values are important as they determine where the apogees are, where satellite motion is slowest. These figures place the apogees at the furthest angles in declination from the equator, and keep the active arcs, which span 216 degrees of Mean Anomaly, well separated from the equatorial arc. As the Argument of Perigee departs from these values, the ends of the active arcs will move toward the equator. Some slight variation in argument of perigee from the cited value, on the order of one degree, might be desirable to ensure good satellite spacing at orbit crossings, depending on the results of further analyses. Otherwise little flexibility exists in these numbers.

e. Longitude of Apogees: This measure specifies where the peaks of the active arcs are located over the surface of the earth in coordinates relative to the rotating earth.

For a Mean Motion of 3, a satellite's ground track will pass through three apogee longitudes, spaced 120 degrees from each other in longitude. Therefore, for a given ground track, specifying one Longitude of Apogee specifies the other two as well. For convenience therefore, specifying the location of the active arcs in the region from 0 degrees West Longitude to 120 degrees West Longitude is sufficient to locate a ground track in any Longitude orientation. This range may be termed the Americas Sector (the others may be termed the EurAsian Sector and the Pacific Sector).

Figure 12:
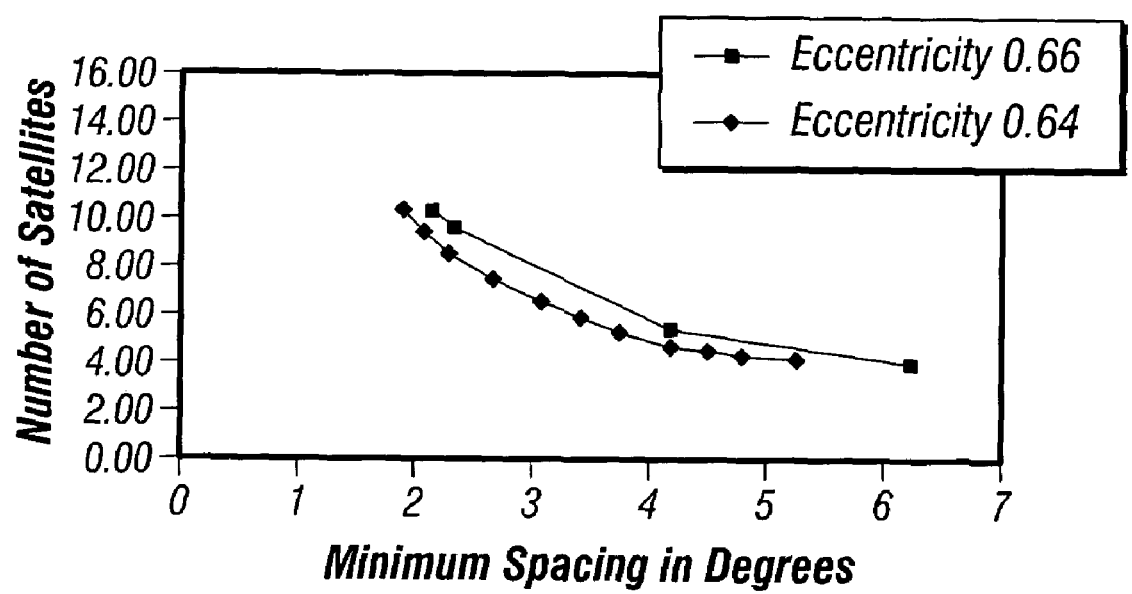
FIG. 12 shows a chart that charts the number of satellites in an arc vs. eccentricity and spacing.

A given ground track may have any Longitude of Apogee in this 0-120 degree range. Good coverage of important markets may be an important criteria for selecting the locations of the Longitude of Apogees. The second ground track should have an Apogee of Longitude that places the active arcs between those of the first, without crossing and maintaining a good separation from those of the first. Once the location of the first active Arc is located, the second may be place 60 degrees in Longitude from the first, or slightly more or less, depending on desired coverage versus active arc separations.

f. Active Arc Span: 2 hours and 24 minutes (or 108 degrees of Mean Anomaly) to each side of apogee, plus x minutes per side for housekeeping, switchover. The ratio of active satellites to total satellites per ground track per system determines this span. This choice derives from 3 active satellites and 5 total satellites per ground track. It is however possible to design a VGSO arrangement using 3 active arcs one active satellite per arc, and 4 total satellites rather than 5. In this case the active arcs extend down to 28 degrees North declination at a minimum operational altitude of around 11,900 kilometers rather than the 17,500-18,000 kilometers of the present design. The satellites would have to cope with a greater variation in orbital altitude, but would be in operation for 75 percent of the time each. Coverage areas may not benefit much, since the extensions of the active arcs are at relatively low altitudes.

g. Mean Anomaly at epoch: selected to place each satellite at an appropriate interval from its neighbor. The absolute number is not so important here as the relative MA. Absolute MA will determine when the satellite passes a point on the earth. Relative MA will determine the separations among satellites. Mean Anomaly spacing and minimum included zenith angles of the satellites are related as shown in FIG. 12 shown later.

2. In order to realize the advantages of VGSO, the FCC could standardize the parameters shown in Table 2:

TABLE 2

Parameters to be Standardized

| IV. PARAMETER | V. SUGGESTED VALUE |
|---|---|
| VI. MEAN MOTION | VII. 3 (SEMIMAJOR AXIS = 20,270.421 KM) |
| Eccentricity | In range of 0.66 to 0.63 (0.64 attractive) |
| Inclination | 63.435 degrees, or that required to stop apsidal rotation |
| Longitudes of Apogees | 65 and 125 degrees W Longitude in Americas Sector. Further study may suggest other locations |
| Argument of Perigees | 270 degrees for Northern HLSAs; 90 degrees for Southern HLSAs |
| Active Arc extents (may be specified as degrees of Mean Anomaly in orbit) | 108 degrees (plus 3 degrees housekeeping) of MA each side of apogee |
| Index position in each ground track, defined as a Mean Anomaly at a cited epoch, from which all satellite positions are to be measured. | 0 degrees MA at Jan. 1, 2005 |
| Spacing in ground track (in Mean Anomaly, or alternatively, time of cited point crossing) for each service type to be authorized | 15 degrees MA |
| Required minimum earth station antenna pattern characteristics for each such spacing or corresponding service | per existing FSS for 2 degree spacing |

TABLE 2-continued

Parameters to be Standardized

| IV. PARAMETER | V. SUGGESTED VALUE |
|---|---|
| Orbital maintenance tolerances: In track Cross-track Altitude | as later determined to be necessary |
| Downlink PED limits when in HLSA | [TBD] |
| Emission attenuation (or maximum eirp or PFD) when outside HLSA | [TBD] |

4. Each High Latitude Stationary Arc (HLSA) is one active arc on one ground track. Each ground track has three HLSAs. A system may provide substantial Northern Hemisphere coverage from 5 satellites in one Northern HLSA ground track, providing service from the equator northward everywhere under the active arc. At the worst-case Longitude exactly between active arcs, coverage from a single ground track exists North of 30 degrees North. Coverage of the Southern Hemisphere is similar, using a single Southern HLSA ground track. Global coverage pole to equator to pole may be attained using two Northern and one Southern ground tracks and 15 satellites, with good HLSA placements. Full-time coverage from a HLSA requires 5 satellites per ground track.

Services offered by many prospective operators will concentrate on regional markets, or for example on markets primarily on land-masses. Ground track occupancy and visibility requirements can be reduced in that case. An operator seeking to service specific regions would place satellites in the ground tracks with active arcs serving those regions. A consortium of operators may share in the development, construction, and launch costs of satellites serving a particular ground track and its three HLSAs. Since each satellite visits all active arcs in the ground track, a satellite loss is spread over three markets rather than one, and results in a 20 percent time-outage rather than a 100 percent outage. Sparing is cheaper (e.g., 1 for 5 rather than 1 for 1), risk is spread over several operators (similar to an insurance pool), and loss consequences are less drastic. VGSO deployments are therefore also well suited to regional services.

FIG. 12 presents the number of satellite systems that can be accommodated in each ground track. Each satellite may belong to a different system. If a given system requires only one ground-track and places an active satellite in each of the three HLSAs, each ground track would, for example, accommodate 14 satellites per ground track (for e=0.64) at a minimum required 2 degree included zenith angle between satellites. The zenith angle may be measured from the earth's center through the satellite. More may be accommodated if measured from the surface of the earth. With four ground tracks, the VGSO allocation scheme can accommodate 56 systems, each with a satellite at all times in each of three HLSAs. Each such system may moreover be viewed as equivalent to three regional systems, one per satellite per HLSA, for a total of 168 distinct regional operations possible.

In granting a license for a VGSO assignment, the Authority would be assigning satellite deployment parameters as described in Table 2, Parameters to be Standardized, above, plus an authorized service and authorized spectrum. In addition, the Commission assigns a position within a ground track to a licensee, defined as a Mean Anomaly relative to the index position. The Commission may wish to grant assignments in units of multiple, e.g. 5 satellites in one ground track evenly spaced by 216 degrees in Mean Anomaly from each other, the first of which maintains the specified Mean Anomaly relative to the index position. This assignment places one satellite at all times in each HLSA of the one ground track. As above, 14 such assignments are possible given 2-degree spacing. The Space Station would be licensed to operate in each HLSA of the ground track. Licensees would require separate ground station licenses for each ground station served by each HLSA of the ground track.

Figure 13:
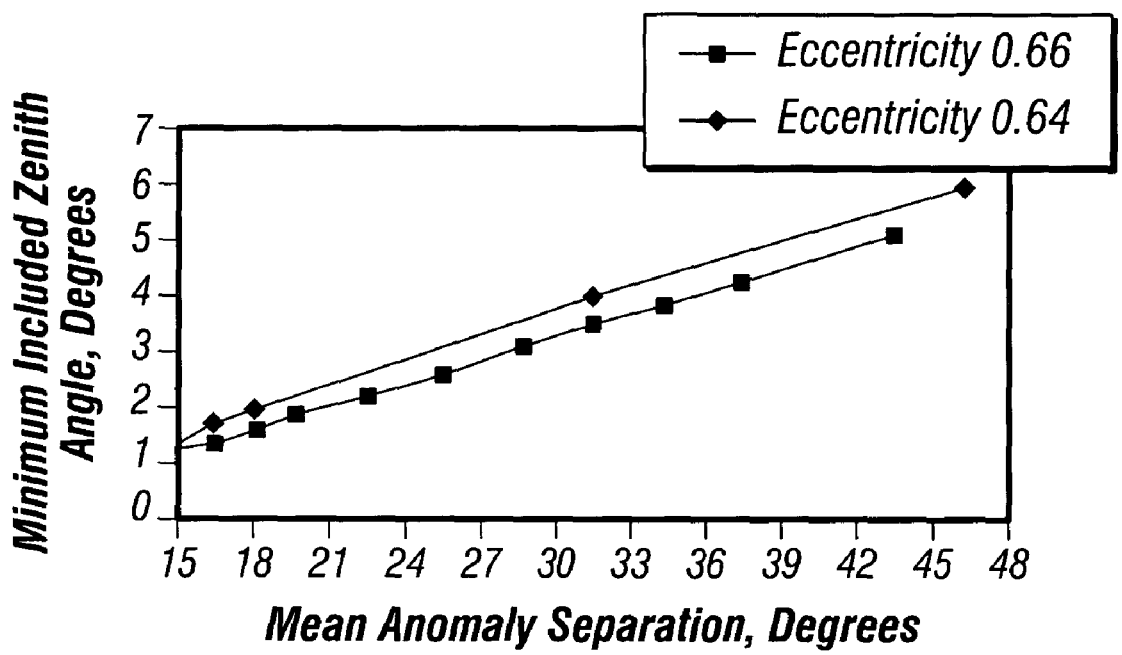
FIG. 13 illustrates the differences in mean anomaly separation between the different degrees of separation.

FIG. 13 relates Mean Anomaly difference to the minimum included zenith angle of adjacent satellites for two different eccentricities. Note that differences in True Anomaly are normally defined within the same orbit, which is not the case here. Hence, while it is acceptable to assign slots based on Mean Anomaly differences, minimum included zenith angle (the angle between two satellites measured from the center of the earth) is a more accurate measure of satellite separation than True Anomaly, since it also accounts for orbit plane separation angles.

Figure 14:
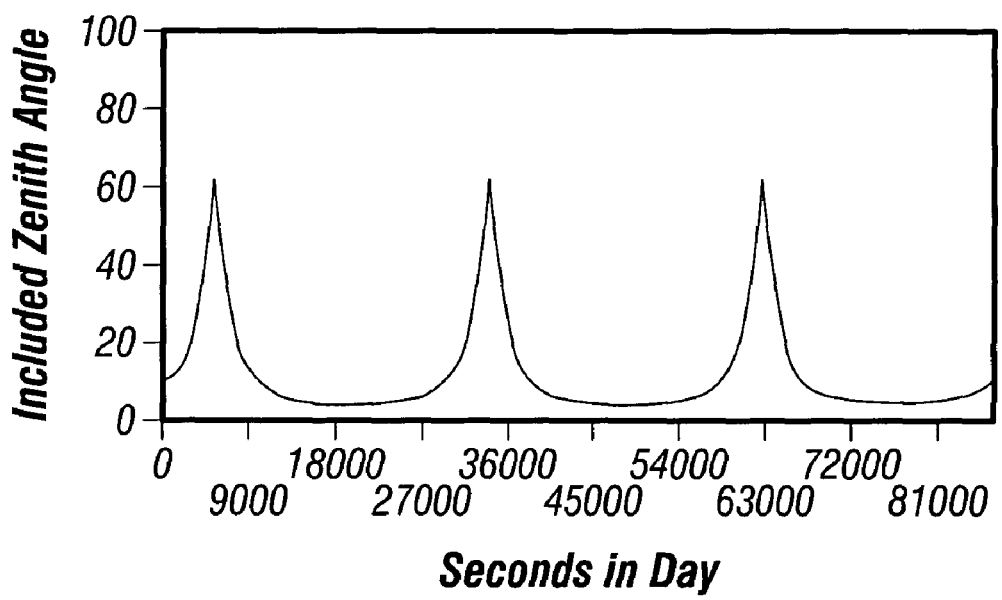
FIG. 14 illustrates the variation in included zenith angle with time between two adjacent satellites spaced at 2 degrees at apogee

FIG. 14 illustrates the variation in included zenith angle with time between two adjacent satellites spaced at 2 degrees at apogee. The time spent in the HLSA is in the flat low-valued region, whereas the peaks represent satellite passage through perigee, when they separate widely and inactive.

True Anomaly, which is related to included zenith angle, cannot be calculated from Mean Anomaly, since Mean Anomaly is expressed as a transcendental function of true anomaly, and the equation cannot be inverted to solve for TA. Numeric techniques are often used for this purpose, and were used (via orbital analysis software) to derive the values in included zenith angle in this description.

Although only a few embodiments have been disclosed in detail above, other modifications are possible.

All such modifications are intended to be encompassed within the following claims, in which:

What is claimed is:

1. A method, comprising: forming a satellite system which includes a plurality of satellites in an inclined elliptical orbit, said plurality of satellites communicating with the earth, and which orbit has a first portion during which the satellites have a speed which is similar to the speed of rotation of the earth and a second portion of the orbit that is not similar to the rotation of the earth, wherein said orbit is virtually geosynchronous during the first portion; and allocating at least one of the satellites within the first portion of the orbit to a first licensee and allocating at least one other one of the satellites in the first portion of the orbit to a different licensee than the first licensee.

2. A method as in claim 1, further comprising defining a measure for the satellites in the orbit, and defining said allocating according to said measure.

3. A method as in claim 2, wherein said measure comprises a time when a satellite will arrive in a specified location within the orbit.

4. A method as in claim 2, wherein said allocating comprises includes a plurality of standardized parameters.

5. A method as in claim 4, wherein said standardized parameters include eccentricity, inclination, longitude of apogee, and argument of perigee.

6. A method as in claim 3, further comprising tracking the satellite by adding sidereal days to the specified measure.

* * * * *